No. 821,173. PATENTED MAY 22, 1906.
F. K. KREUTZ.
FILTER.
APPLICATION FILED DEC. 1, 1905.

2 SHEETS—SHEET 1.

Witnesses
K. Lockwood Nevins
Bessie Hofinkel

Inventor
F. Karl Kreutz
By
F. W. Winter
Attorney

No. 821,173.  
PATENTED MAY 22, 1906.
F. K. KREUTZ.  
FILTER.  
APPLICATION FILED DEC. 1, 1905.
2 SHEETS—SHEET 2.
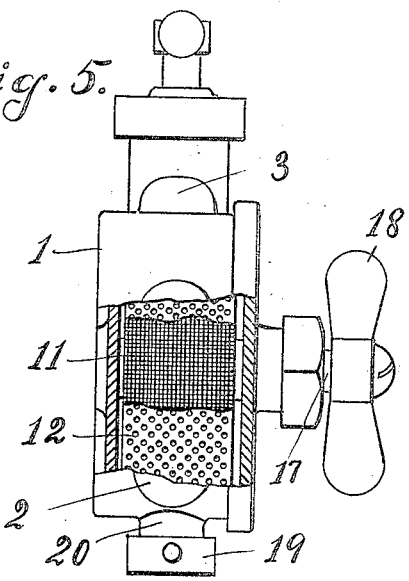
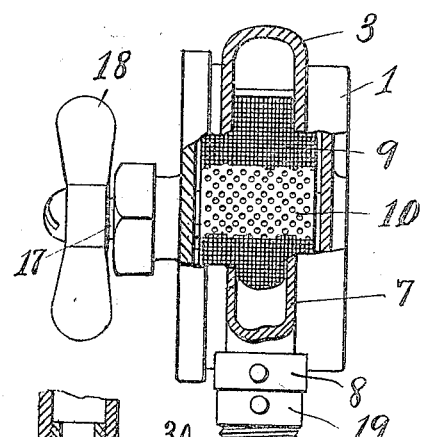
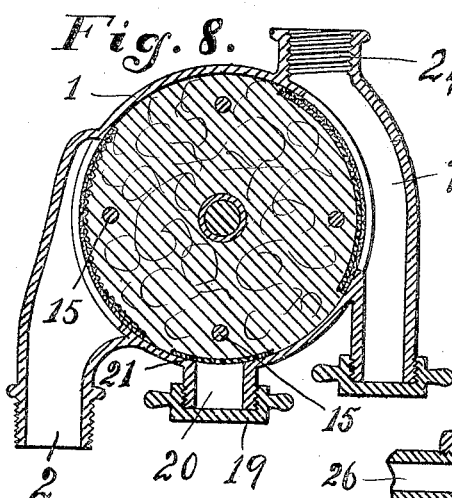
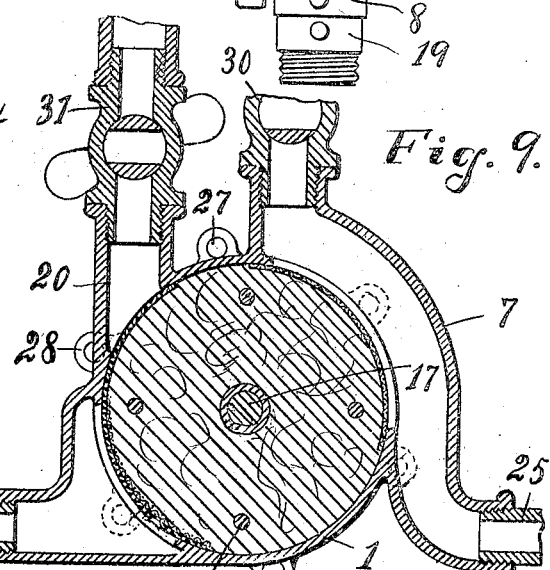
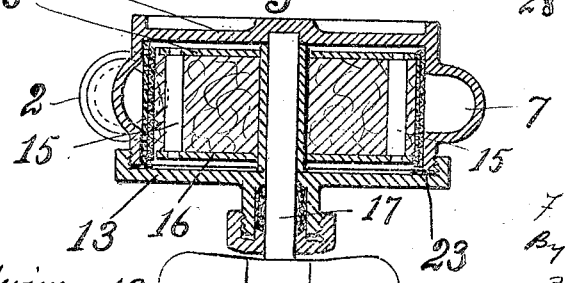
Witnesses  
K. Lockwood-Nevins  
Bessie H. Finkel
Inventor  
F. Krone Kreutz  
By  
F. W. Winter  
Attorney

UNITED STATES PATENT OFFICE.

FRANK KRONE KREUTZ, OF SAN FRANCISCO, CALIFORNIA.

FILTER.

No. 821,173.  Specification of Letters Patent.  Patented May 22, 1906.

Application filed December 1, 1905. Serial No. 289,766.

*To all whom it may concern:*

Be it known that I, FRANK KRONE KREUTZ, a subject of the German Emperor, residing at San Francisco, in the county of San Francisco and State of California, have invented certain new and useful Improvements in Filters, of which the following is a specification.

This invention relates to improvements in filters, and especially to that class of filters which purify the water as it runs from a pipe or faucet, the object of the invention being to provide a filter of this character which will be comparatively cheap and simple in construction, contain few parts, which will filter the water more effectively than heretofore both from particles of mud in suspension and from microscopic organisms, in which the filtering material can be used to the best advantage, and which can be easily and quickly cleaned at suitable intervals.

Figure 1:
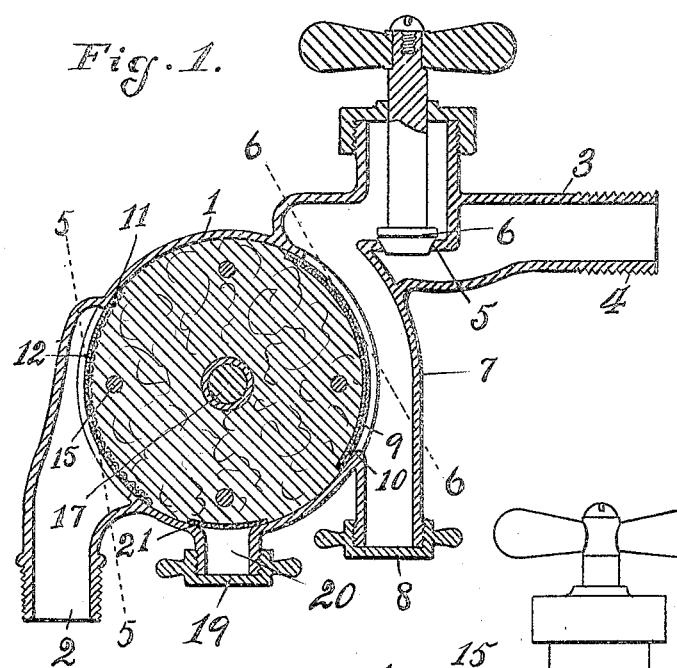
Figure 4:
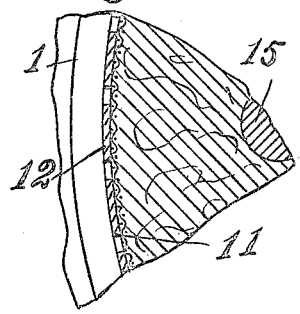
Figure 2:
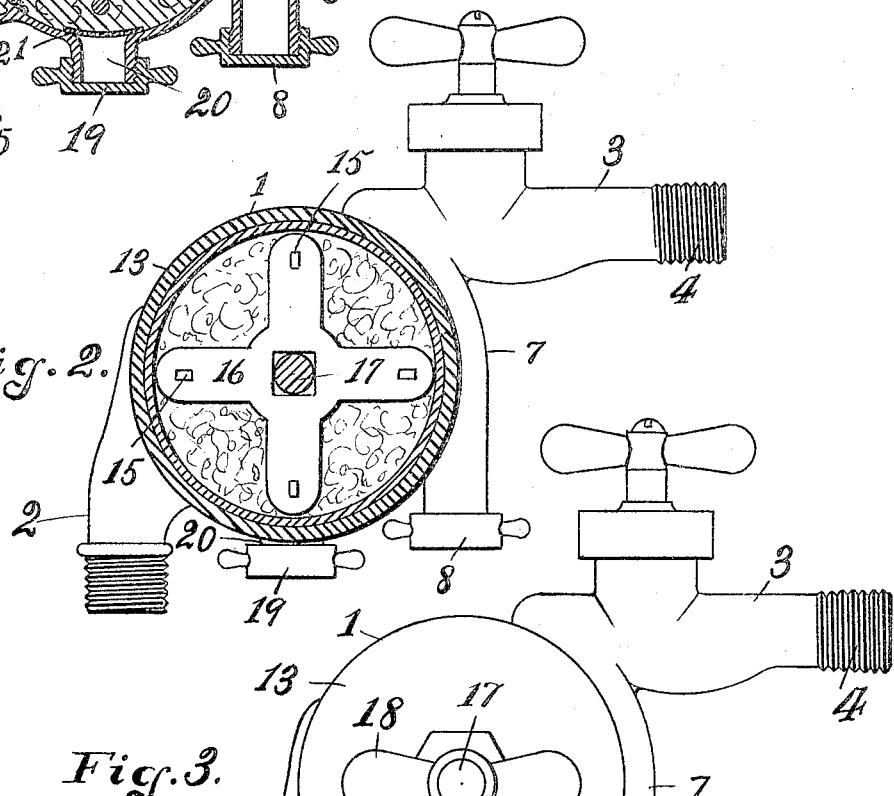
Figure 3:
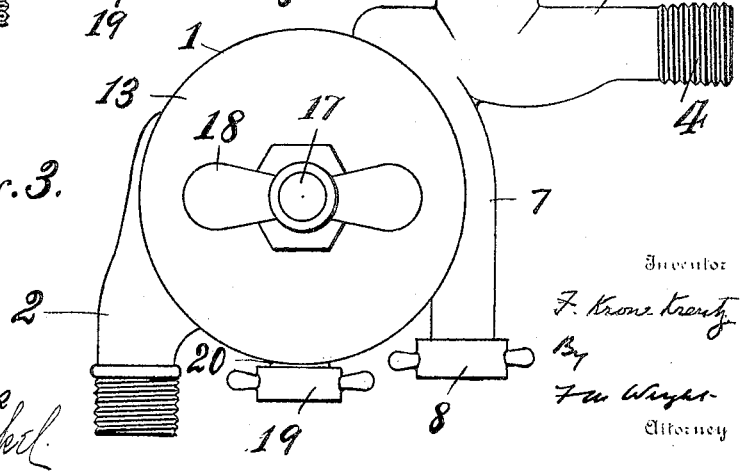

In the accompanying drawings, Figure 1 is a central vertical section of my improved device. Fig. 2 is a vertical section of the same near one side thereof. Fig. 3 is an outside view of the same. Fig. 4 is an enlarged vertical section through one of the pairs of springs. Fig. 5 is a vertical transverse section on the line 5 5 of Fig. 1. Fig. 6 is a similar view on the line 6 6 of Fig. 1. Fig. 7 is a horizontal section. Fig. 8 is a view similar to Fig. 1 of a modified form of the invention. Fig. 9 is a similar view of a further modification.

Referring to the drawings, 1 represents the casing of a filtering-box substantially cylindrical in form, having formed integral therewith on one side a spout 2 to discharge the filtered water. On the opposite side a conduit 3 for supplying the water to the filter is formed with an elongated opening in its side much longer than the diameter of the conduit, and through the opening the filtering-box, which is integral with the conduit, receives the water to be filtered. Said conduit 3 is threaded at its end, as shown at 4, to permit it to be coupled to the service-pipe and has formed therein a valve-seat 5 for a valve 6, controlling the supply of water to the filter. Also formed integral with the casing is an extension 7 of the supply-conduit, threaded at its end and closed by a cap or closure 8. This extension 7 forms a large settling or separating chamber to permit the settling of impurities which are excluded from the filter by the filtering-screens.

Across the opening between the cylindrical filtering-box and the supply-conduit are secured the screens 9 10, of which the outer screen 9 is of the finest mesh, while the inner screen 10 is of a much coarser mesh and more rigid than the screen 9, its function being merely to support in place the screen 9, which latter does the actual work of excluding even very fine particles suspended in the water. On the side of the cylindrical box opposite to the screens 9 10 is a similar pair of screens 11 12, which are interposed between the main body of the filter and the entrance of the discharge-spout 2, which entrance is extended through a very considerable arc, thereby providing a very large screen area and permitting a full flow of water therethrough. These screens 11 12 are similar to the screens 9 10, the screen 11 being of the finest mesh and the outer screen 12 being a coarser mesh and serving only to support the screen 11 in place. It will be observed that in each place the screen of finer mesh is on the side facing the current and the coarser screen is on the side from which the current flows. This prevents the screens being clogged up by particles being wedged in the interstices of the screens, for any particles that can pass through the fine screen will readily flow through the coarser screen.

In the interior of the cylindrical box 1 I provide as a filtering material compressed sponge. This sponge is inserted in the cylindrical body to completely fill the same and is then compressed therein by screwing down the cover 13. By thus compressing the sponge and on account of its being a flexible material it can be made to completely fill the filtering-box and although compressed very tightly always remains porous, the pores or channels being extremely fine and while permitting the water to flow therethrough excluding, by reason of the fineness of the pores when so compressed, even microscopic organisms, as well as inorganic matter. In prior devices of this nature sand has generally been used as the filtering material. It is impossible, however, to compress a quantity of sand beyond a certain degree, since the particles of sand are themselves substantially incompressible. The passages between said particles of sand are by no means so narrow as the pores in the compressed sponge and do not exclude microscopic living organisms which the pores of the compressed sponge effectually exclude. It will be seen, therefore, that the filter is efficient, because it comprises three filtering means operating in succession—namely, first, the settling-chamber, which segregates comparatively heavy particles; secondly, the screen, which excludes even fine particles in suspension, and, thirdly, the compressed sponge, which arrests microscopic organic or inorganic matter. By providing each of these means to operate in succession the work which would otherwise be required to be done by the filtering means in the filtering-box is considerably reduced, so the whole device is rendered more efficient.

A further advantage of compressed sponge as compared with sand or similar loose filtering material is that with the latter when there is at any point in the body of the material a comparatively open passage for the water the water flowing through said passage with a higher velocity than through the adjacent portion of the filtering material tends to widen said passage and to make for itself a larger channel, this effect continually increasing until the passage becomes so large that the water passes therethrough unfiltered. With compressed sponge this cannot happen.

In order to permit all parts of the sponge to be interposed in the direct path of the water from the inlet-screen to the outlet-screen, there are provided in the filtering-box bars 15 between plates 16 on a shaft 17, provided on the outside with a handle 18, permitting it to be turned. By this means the sponge may be turned through a small angle from time to time, so that eventually the whole surface of the sponge has been brought into use.

When it is desired to clean the filter, a cap 19 is removed from a cleaning-outlet 20 and is screwed onto the end of the spout 2 to close said spout. Above the outlet 20 is a coarse screen 21. Then the water is turned on and permitted to flow through the sponge and out through said outlet, and since the screen 21 is very coarse all the particles are readily washed from the sponge through said outlet. The sponge should be turned by means of the handle 18 while the water is flowing through the filtering-box to clean the same.

In Figs. 1 and 2 the filtering-box is closed by a cap-plate 13, screwed onto the side of the box, which is made water-tight by a rubber gasket 23.

Figs. 1 to 7 show the filter as provided for connection with a water-supply pipe and having a faucet-valve therein. Fig. 8 shows the filter as formed for connection with the end of a faucet, the valve 6 being in this case omitted and the supply-passage being provided with an internally-threaded end 24 to be screwed upon the end of the faucet. Fig. 9 shows the device as constructed to be interposed between two pipes—a service-pipe 25 and a discharge-pipe 26. As in this case the filter would be made of a large size, the cover is secured by a number of screws 27 and lugs 28. In this case the extension 7 and cleaning-outlet 20 are closed by valves 30 31.

I claim—

1. A filter comprising a casing having a filtering-box, a service-pipe on one side of said box having an extension to form a settling-chamber, a discharge-pipe on the opposite side of said box, said service and discharge pipes opening through the circumference of said box over a large arc of said circumference, screens covering the passages between said pipes and box, compressed sponge in said box, and means for turning said sponge in said box, substantially as described.

2. A filter comprising a casing having a filtering-box, a service-pipe on one side of said box having an extension to form a settling-chamber, a discharge-pipe on the opposite side of said box, said service and discharge pipes opening through the circumference of said box over a large arc of said circumference, screens covering the passages between said pipes and box, compressed sponge in said box, and means for turning said sponge in said box, the box having a cleaning-outlet, and a coarse screen over said outlet, substantially as described.

3. A filter comprising a casing having a filtering-box, a service-pipe on one side of said box, a discharge-pipe on the opposite side of said box, said service and discharge pipes opening through the circumference of said box over a large arc of said circumference, screens covering the passages between said pipes and box, compressed sponge in said box, and means for turning said sponge in said box, substantially as described.

4. A filter comprising a casing having a filtering-box, a service-pipe on one side of said box, a discharge-pipe on the opposite side of said box, said service and discharge pipes opening through the circumference of said box over a large arc of said circumference, screens covering the passages between said pipes and box, compressed sponge in said box, and means for turning said sponge in said box, the box having a cleaning-outlet, and a coarse screen over said outlet, substantially as described.

In witness whereof I have hereunto set my hand in the presence of two subscribing witnesses.

FRANK KRONE KREUTZ.

Witnesses:
 BESSIE GORFINKEL,
 K. LOCKWOOD NEVINS.